Figure 3:
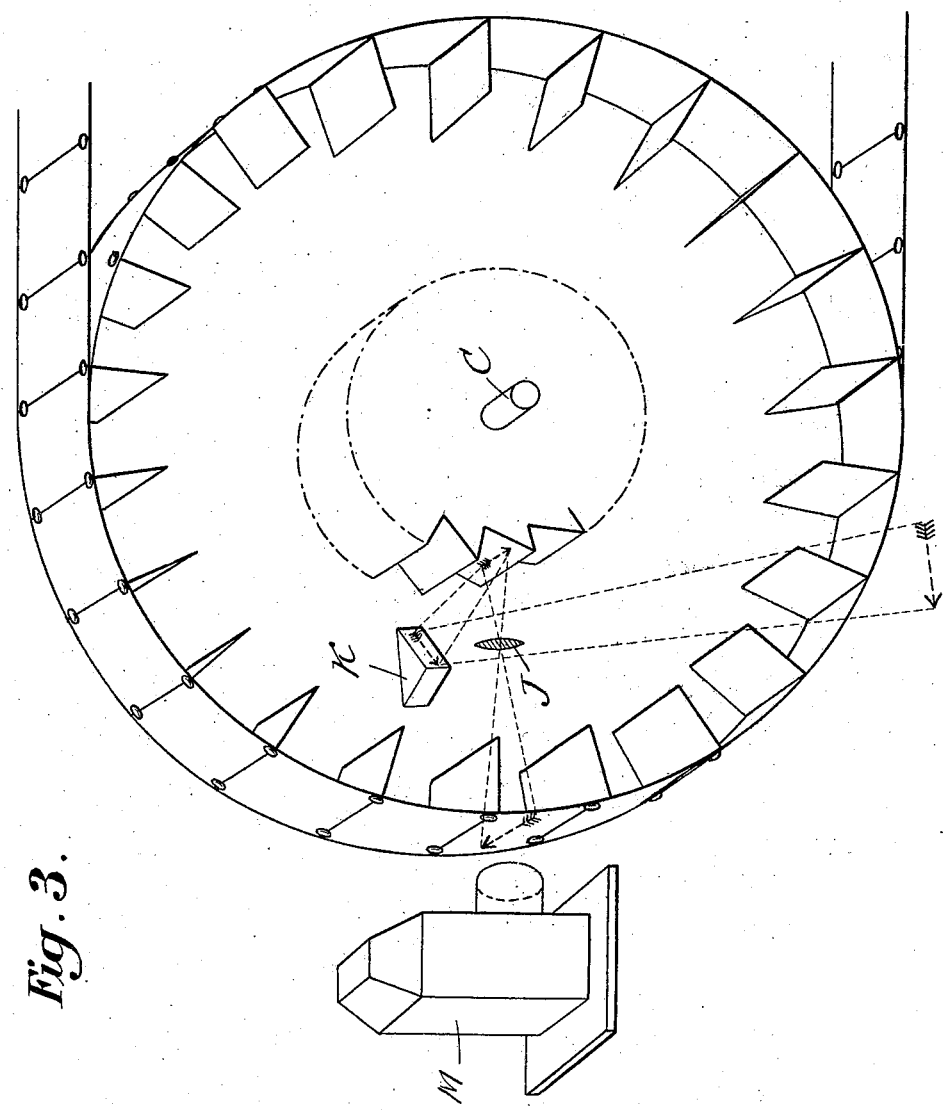

No. 691,411. Patented Jan. 21, 1902.
H. SCHMIDT & W. HAENSCH.
CINEMATOGRAPH.
(Application filed July 24, 1900.)
(No Model.) 2 Sheets—Sheet 1.
Fig. 1.
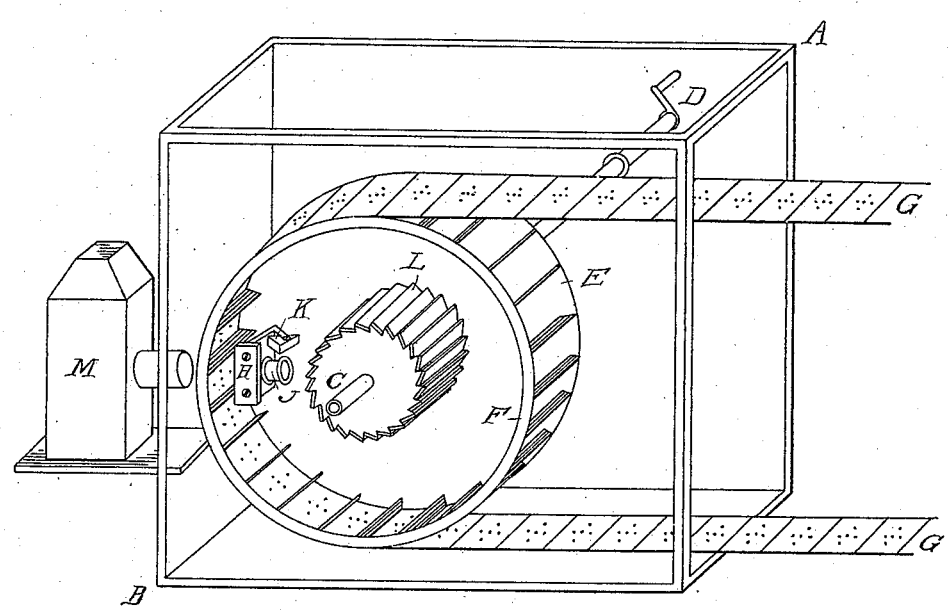
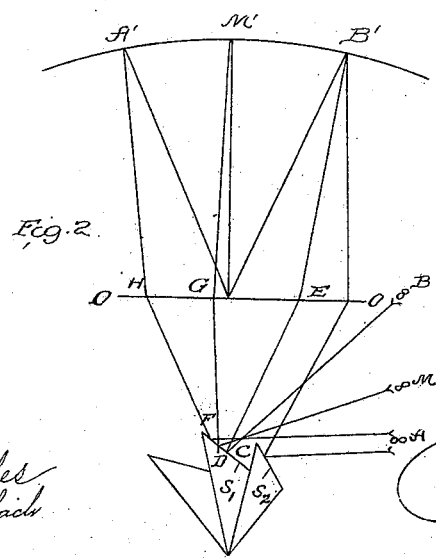
Fig. 2.

No. 691,411. Patented Jan. 21, 1902.
H. SCHMIDT & W. HAENSCH.
CINEMATOGRAPH.
(Application filed July 24, 1900.)

(No Model.) 2 Sheets—Sheet 2.

UNITED STATES PATENT OFFICE.

HUBERT SCHMIDT AND WILHELM HAENSCH, OF BERLIN, GERMANY.

CINEMATOGRAPH.

SPECIFICATION forming part of Letters Patent No. 691,411, dated January 21, 1902.

Application filed July 24, 1900. Serial No. 24,733. (No model.)

*To all whom it may concern:*

Be it known that we, HUBERT SCHMIDT and WILHELM HAENSCH, subjects of the Emperor of Germany, residing at Berlin, German Empire, have made certain new and useful Improvements in Cinematographs, of which the following is a specification.

In order to prevent the disagreeable and disturbing jerky movement of individual pictures in cinematographs, the film-strip is revolved continuously around the periphery of a wheel, and by a special optical device the stopping of the picture at the production and the carrying along of the same on the sensitive layer at the taking are effected.

Several constructions exist which aim at effecting the stopping of the picture at the projection by a rotary rim of mirrors, the radius of which is precisely half of the distance of the picture from the axis.

The stopping is effected in this construction only by the rim of mirrors, owing to the fact that the virtual picture of each individual picture is situated in the axis. The objective serves only for the projection of this picture, which is already arrested. These constructions suffer from the drawback that only the axis or center line of the picture stands still, while the sides execute pendulum movements around the center.

Figure 1 is a perspective view of the invention. Fig. 2 is a diagram explaining the same. Fig. 3 is a perspective view, on an enlarged scale, of the essential parts of the apparatus.

In the construction hereinafter described the stopping at the projection is effected by the coöperation of a rim of mirrors of any radius desired and an objective situated between the rim of mirrors and the layer of pictures, the focal length of said objective being approximately equal to half of the distance between the picture-layer and the axis.

M is a projecting-lantern which projects its light on the pictures from without. The rays thus pass first through the film-strip to the objective. From there they pass to the rim of mirrors, from there back to the prism K, and thence leaving the surface on which the letter K is indicated they are projected in a plane parallel to the axis of rotation of the circle of mirrors and film-strip, as indicated in dotted lines, Fig. 3. The objective is situated substantially midway between the picture-layer carrier and the axis of rotation of the drum which carries the mirror-circle.

Through a box A B, the front wall of which is drawn as if it were transparent, but which, as a matter of fact, has only one opening at K, passes the axle C D horizontally. It can be revolved from behind by a crank. On the axle is arranged a circular plate E E in vertical position, said plate carrying a rim or wheel F F on thin metal walls. Around the periphery of this wheel passes the film-strip G G. A dotted cross indicates in this instance the picture or image on the same. On the front wall of the box is fixedly arranged the board H, which carries the objective J and the prism K. The latter are therefore not connected with the wheel. On the plate E E is, moreover, the rim of mirrors L L, which revolves with the axle. In this new construction in the taking of the picture the rays of light strike first the rotating rim of mirrors before they traverse the objective. This course of the rays is naturally the contrary to the course of the rays of the projecting-lantern—*i. e.*, the rays of daylight strike the prism K, passing from there to the mirrors, thence to the objective, and through the objective to the sensitive film. As the subjects to be taken are situated at a very great distance in proportion to the small dimensions of apparatus, the pencils or bundles of rays striking from each individual point of the subject to be taken upon one of these mirrors will consist of rays almost parallel to each other. Parallel rays, however, are reflected by plane mirrors as parallel rays, and it is entirely immaterial in that respect what is the inclination of the mirrors to the rays. This is also true of all points of the subject to be taken. The rays always strike the mirror as parallel rays and return to the objective as parallel rays. Hence they are combined by the latter always in its focal plane to the image-point. The conditions are the same for all points of the image.

Referring to Fig. 2, we will select here three points of the object—B, M, and A, Fig. 2—from which three pencils or bundles of rays parallel to each other strike the mirror S', whose reflecting-surface, as well as that of the part $S^2$, is the upper edge of the triangular figure. The rays B C, M D, and A F each represent one ray of such a pencil of rays. B C is reflected to C E. Hence all rays which come from the point B run after reflection parallel to C E and unite at B'. M D is reflected to D G, and all rays accompanying it from M run parallel to D G to the objective O O and combine at M', while all rays coming from A are reflected parallel to F H on the objective O O and unite at A'. Thus the rays coming from B combine at B', from M at M', and from A at A'. If the mirror revolves as far as the position $S^2$, the picture or image of the point A runs from A' to B', provided that A' B' is the focal face of the objective, which is practically the case, on account of the slight arc to be considered. The reason why the point of formation of the image or picture does not step out from the periphery, hence a pendulum or oscillation movement, is that in all phases of rotation the rays always strike the objective as pencils of pencils or bundles of parallel rays and must thus be united always in its focus. Hence the image or picture must run in all its parts in the focal surface. A deviation behind the focal plane could only take place if the reflected subject would approach the objective materially in the revolution of the mirror, which is not the case. The same holds, of course, good for the projection. Here the rays come indeed from the near film-strip; but they are rendered parallel by the objective before they strike the mirror. Consequently there are no pendulum or oscillation movements of the image in the new construction, because the mirrors here serve the purpose of reproducing subjects at a great distance, in which the slight variations of distance of the mirrors from the subject are precisely eliminated in the rotation in view of the great distance, while the mirrors in former constructions are intended to reproduce images or pictures projected at a slight distance from the objective, so that their distance from the mirror is already perceptibly changed with the rotation.

We wish to refer to another advantage arising from the circumstance that the mirrors are struck by parallel rays. It thus becomes possible to utilize the only practically available mirrors, which are silvered on the back and which will not give double pictures.

We claim—

In apparatus for producing stationary pictures the combination of a drum-like carrier for the picture-layers, a rim or circle of mirrors arranged concentrically within the drum and means for rotating the drum-like carrier and the mirrors at the same angular velocity, an objective arranged between the picture-layer carrier and the rim or circle of mirrors substantially midway between the picture-layer carrier and the axis of rotation of the drum which carries the mirror-circle.

In testimony that we claim the foregoing as our invention we have signed our names in presence of two subscribing witnesses.

HUBERT SCHMIDT.
WILHELM HAENSCH.

Witnesses:
WOLDEMAR HAUPT,
HENRY HASPER.